(12) United States Patent
Qian

(10) Patent No.: US 11,383,444 B2
(45) Date of Patent: Jul. 12, 2022

(54) SYSTEMS AND METHODS FOR CONTROLLING SUPPORT STRUCTURES IN MANUFACTURING

(71) Applicant: Wisconsin Alumni Research Foundation, Madison, WI (US)

(72) Inventor: Xiaoping Qian, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 228 days.

(21) Appl. No.: 16/704,899

(22) Filed: Dec. 5, 2019

(65) Prior Publication Data

US 2020/0108560 A1    Apr. 9, 2020

Related U.S. Application Data

(62) Division of application No. 15/141,124, filed on Apr. 28, 2016, now Pat. No. 10,525,628.

(51) Int. Cl.
  *B29C 64/386* (2017.01)
  *B29C 64/393* (2017.01)
  *G06F 7/00* (2006.01)
  *B29C 64/40* (2017.01)
  *B33Y 50/00* (2015.01)

(52) U.S. Cl.
  CPC .......... *B29C 64/386* (2017.08); *B29C 64/393* (2017.08); *G06F 7/00* (2013.01); *B29C 64/40* (2017.08); *B33Y 50/00* (2014.12)

(58) Field of Classification Search
  CPC ..... B29C 64/386; B29C 64/393; B29C 64/40; G06F 7/00; B33Y 50/00
  See application file for complete search history.

(56) References Cited

U.S. PATENT DOCUMENTS

| | | | |
|---|---|---|---|
| 9,395,466 B1 | 7/2016 | Mallet | |
| 10,948,896 B2 * | 3/2021 | Pedersen | G06F 30/00 |
| 2010/0086721 A1 | 4/2010 | Batchelder | |
| 2014/0277669 A1 * | 9/2014 | Nardi | C23C 24/04 700/103 |
| 2014/0305529 A1 * | 10/2014 | Kroll | B22F 10/20 138/111 |
| 2015/0066178 A1 | 3/2015 | Stava | |
| 2015/0142153 A1 | 5/2015 | Chun | |
| 2015/0151493 A1 | 6/2015 | Schmidt | |

(Continued)

OTHER PUBLICATIONS

Brackett, et al., Topology Optimization for Additive Manufacturing, In Proceedings of the Solid Freeform Fabrication Symposium, Austin, TX, 2011, pp. 348-362.

(Continued)

*Primary Examiner* — Vincent H Tran
(74) *Attorney, Agent, or Firm* — Quarles & Brady LLP

(57) ABSTRACT

Systems and methods for controlling support structures in manufacturing are provided. In particular, the present disclosure provides systems and methods for characterizing the support volume in the design phase based on a perimeter length of a boundary with undercut, projected along a build direction, referred to as a projected undercut perimeter (PUP). By constraining this PUP, the amount of support structures in resulting designs are effectively controlled. By constraining overhang able based PUP, the resulting designs can self support.

9 Claims, 13 Drawing Sheets
(11 of 13 Drawing Sheet(s) Filed in Color)

(56) References Cited

U.S. PATENT DOCUMENTS

| | | | |
|---|---|---|---|
| 2015/0246488 A1* | 9/2015 | Boettcher | B29C 64/40 |
| | | | 264/40.1 |
| 2016/0144574 A1* | 5/2016 | Eilken | B29C 64/386 |
| | | | 264/129 |
| 2016/0200051 A1* | 7/2016 | Urbanic | B29C 64/40 |
| | | | 264/308 |
| 2017/0136539 A1* | 5/2017 | Chou | B22F 10/20 |
| 2017/0176975 A1 | 6/2017 | Pedersen | |
| 2017/0232518 A1* | 8/2017 | Shi | B22F 3/105 |
| | | | 419/7 |
| 2019/0001657 A1 | 1/2019 | Matusik | |

OTHER PUBLICATIONS

Driessen, A. M. "Overhang constraint in topology optimisation for additive manufacturing: a density gradient based approach." Sep. 2, 2016, Department of Precision and Microsystems Engineering.

Gaynor, et al., Topology Optimization for Additive Manufacturing: Considering Maximum Overhang Constraint, 15th AIAA/ISSMO Multidisciplinary Analysis and Optimization Conference, Jun. 16-20, 2014, (AIAA 2014-2036), 8 pages.

* cited by examiner

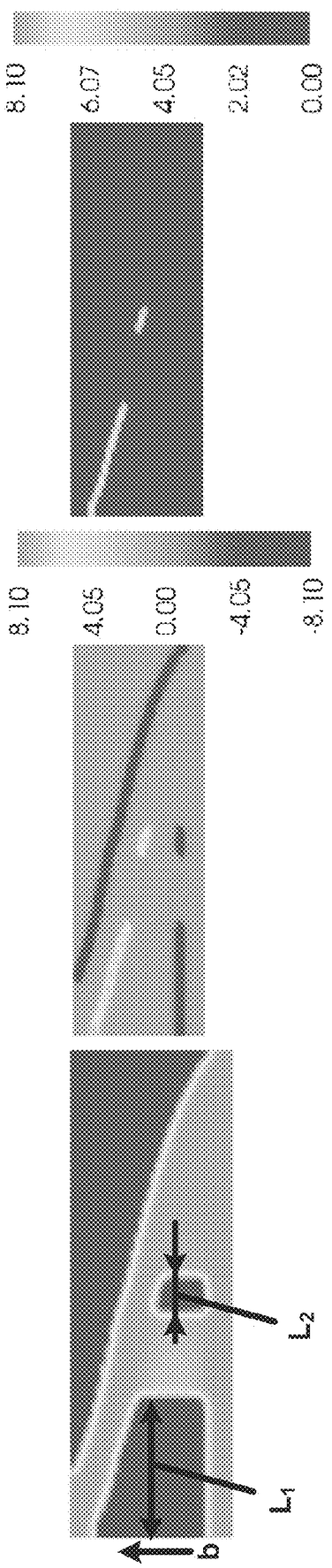

SYSTEMS AND METHODS FOR CONTROLLING SUPPORT STRUCTURES IN MANUFACTURING

CROSS-REFERENCE TO RELATED APPLICATIONS

This patent application is a divisional filing under 35 U.S.C. 111(a) of U.S. application Ser. No. 15/141,124, filed Apr. 28, 2016, which is hereby incorporated by reference herein in its entirety.

STATEMENT REGARDING FEDERALLY SPONSORED RESEARCH

Not Applicable.

BACKGROUND

The disclosure relates generally to manufacturing and, more specifically, to systems and methods for controlling support structures during a part design phase in manufacturing.

Additive manufacturing builds parts by depositing materials layer-by-layer under computer control. It has the advantage of building parts of complex shape without part-specific tooling or fixturing. For certain parts with shape undercuts, sacrificial support structures are typically used to hold subsequent layers. Without such support structures, parts with large overhang volume may collapse under gravity.

Removing support structures can be tedious and laborious for some additive manufacturing processes, and can lead to deterioration of surface quality where the support structure(s) meet the manufactured part. For example, support structures may account for approximately 6% to 42% of the total material used to manufacture the part, and can use up to approximately 64% of the manufacturing time. Additionally, removal of the support structures requires additional time for every part manufactured. Thus, the fabrication of support structures can lead to waste of materials, build time, and energy.

BRIEF SUMMARY

The present disclosure provides systems and methods for controlling support structures in manufacturing. In particular, the present disclosure provides systems and methods for characterizing the support volume in the design phase based on a perimeter length of a boundary with undercut, projected along a build direction, referred to as a projected undercut perimeter (PUP). By constraining this PUP, the amount of support structures in resulting designs are effectively controlled.

In one aspect, the present disclosure provides a method for additive manufacturing a part using a three dimensional (3D) printing system. The 3D printing system includes a print head. The method includes designing the part. Designing the part including the steps of: defining physical constraints of the part; and constraining a projected undercut perimeter. The projected undercut perimeter corresponds with a perimeter quantity of a boundary of the part with undercut projected along a build direction. Designing the part further includes generating a part model based on the physical constraints and the projected undercut perimeter. The method further includes manufacturing the part by instructing the print head to deposit material additively to manufacture the part. The manufactured part is a physical representation of the part model.

In another aspect, the present disclosure provides a method for designing a part to be manufactured. The method includes defining physical constraints of the part, and limiting a projected undercut perimeter to be less than or equal to an allowable projected undercut perimeter. The projected undercut perimeter corresponds with a perimeter quantity of a boundary of the part with undercut projected along a build direction. The method further includes generating a part model based on the physical constraints and the allowable projected undercut perimeter. The generated part model is usable by a manufacturing system for manufacture of the part.

In yet another aspect, the present disclosure provides an additive manufacturing system including a print head, a controller in communication with the print head. The controller configured to design a part model based on physical constraints and a projected undercut perimeter. The projected undercut perimeter corresponds with a perimeter quantity of a boundary of the part with undercut projected along a build direction, and the projected undercut perimeter is constrained to be less than or equal to an allowable projected undercut perimeter. The controller is further configured to instruct the print head to deposit material additively to manufacture the part. The part is a physical representation of the part model.

The foregoing and other aspects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

BRIEF DESCRIPTION OF DRAWINGS

The patent or application file contains at least one drawing executed color. Copies of this patent or patent application publication with color drawing(s) will be provided by the Office upon request and payment of the necessary fee.

The invention will be better understood and features, aspects and advantages other than those set forth above will become apparent when consideration is given to the following detailed description thereof. Such detailed description makes reference to the following drawings.

FIG. 4A is an illustration of a design with a projected undercut perimeter constraint $P_0=2.0$ and a grayness constraint $\varepsilon_0=0.15$.

FIG. 4B is an illustration of a directional gradient for the design of FIG. 4A.

FIG. 4C is an illustration of a Heavisided directional gradient for the design of FIG. 4A.

DETAILED DESCRIPTION

Figure 1:
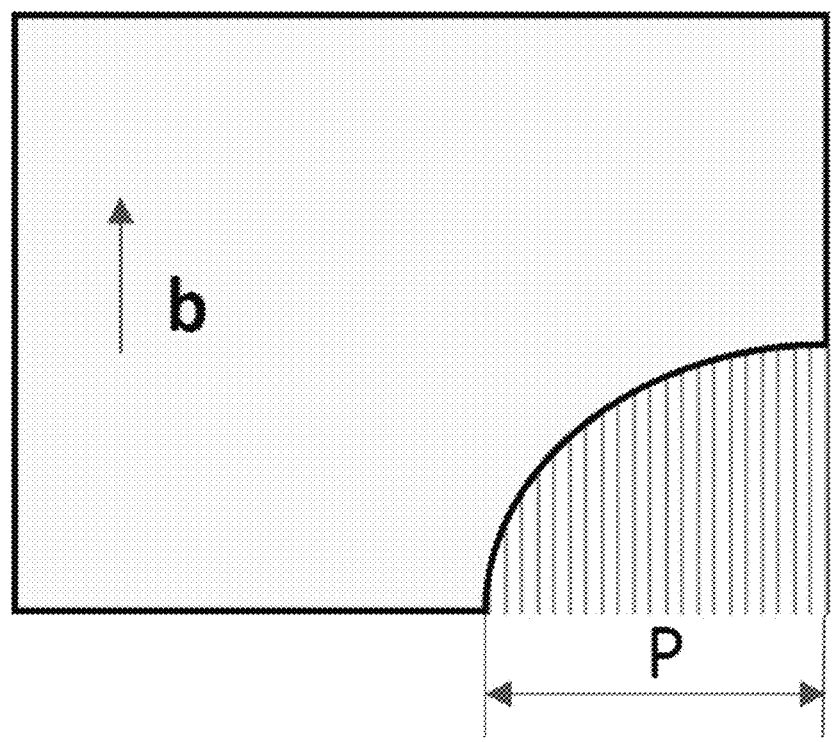
FIG. 1 is a schematic illustration of a projected undercut perimeter, P, according to one aspect of the present disclosure.

Currently, in some processes, support structures are removed by the application of chemical solvents, which induce toxicity, end-of-life-modes, carcinogenic effects, and human health hazards to operators. In other techniques, a reduction in support structures have been attempted by finding optimal build directions, and designing lattice and cellular support structures to reduce the materials for the support structures. Some fabrication techniques have been developed that can produce certain support-free parts by restricting an allowed overhang angle (e.g., in scaffold-free bio-printing). However, none of these techniques address the undesirable attributes of support structures during the design phase, which is the most consequential stage in product development.

Due to the current difficulties in addressing the undesirable attributes of support structures, it would be desirable to have systems and methods for characterizing the support volume or overhang angle in the design phase. By characterizing the support volume and/or overhang angle in the design phase, a formal design methodology may be developed to account for and effectively control the amount of support structures in resulting designs and/or to produce support-free designs via overhang angle control. Controlling the amount of support structures in a design may lead to improvements in part performance, manufacturability, build efficiency, and environmental sustainability by reducing, the consumption of support materials and decreasing build time and energy in, for example, additive manufacturing. One of skill in the art would appreciate that, due to the similarity in direction based shape control, the systems and methods disclosed herein may also positively impact the resolutions of other manufacturability constraints such as casting, molding, and milling, to name a few.

As will be described, the present disclosure provides an approach that can characterize support structures based on a measure of a perimeter length of a boundary with undercut, projected along the build direction, referred to as a projected undercut perimeter (PUP). This perimeter corresponds to boundary length in two-dimensional designs and boundary area in three-dimensional designs. By constraining this PUP in topology optimization, the amount of support structures in resulting designs can be effectively controlled. By controlling the overhang angle, the allowed overhang angle in the resulting designs can be controlled as well.

Topology Optimization

Topology optimization is a design technique that can generate optimal topology and shape under physical constraints. Topology optimization often generates parts of complex shapes that are hard to be manufactured by traditional methods and can be readily done by additive manufacturing.

The present disclosure recognizes that the fundamental challenges in accounting for support structures in topology optimization exists. That is, how to formulate support structures into a geometric constraint while the shape and topology of the design is not known a priori. Additionally, such a constraint should be amenable to efficient computation since many iterations are involved in a typical topology optimization process. Further, such a constraint should be differentiable with respect to optimization variables since topology optimization usually employs a gradient based approach due to the heavy expense of finite element solutions of partial differential equations.

Projected Undercut Perimeter (PUP)

To overcome the above-identified challenges, the present disclosure provides a new measure, PUP, to characterize support structures and to show that the PUP is computable and differentiable without explicit knowledge of the boundary. As shown in FIG. 1, the PUP can correspond with a perimeter length, P, of a boundary with undercut, projected along the build direction b. The PUP can represent the projected undercut length for 2D designs, and projected undercut area for 3D designs. As PUP becomes smaller, undercut volume becomes asymptotically smaller until there is no undercut. The PUP can be expressed as:

$$P = \int_\Omega H(b \cdot \nabla \gamma) b \cdot \nabla \gamma d\Omega \quad (1)$$

where b is the build direction, $\gamma$ is a density field, and $H(\ )$ is a Heaviside function. Equation (1) represents the integration of the directional gradient $b \cdot \nabla \gamma$ multiplied with a Heaviside function $H(b \cdot \nabla \gamma)$ over the design domain. Computationally, equation (1) can be computed efficiently since it involves only one integral equation and is differentiable with respect to the density $\gamma$. More importantly, it circumvents the need of explicit boundary.

Intuitively, equation (1) has contribution only from the boundary for a 0/1 (void/solid) design since the density gradient $\nabla \gamma$ vanishes at the interior. As such, the volume integral of the directional gradient $b \cdot \nabla \gamma$ lead to projected perimeter. Due to its 0/1 switch effect, the use of Heaviside (step) function $H(b \cdot \nabla \gamma)$ thus leads to the measure of PUP. When the directional gradient $b \cdot \nabla \gamma$ is negative at the boundary (i.e., there is no undercut), this term does nothing. When the directional gradient $b \cdot \nabla \gamma$ has undercut (i.e., the directional gradient is positive), it has contribution to the term in equation (1). In another non-limiting example, the switch effect at 0 in the Heaviside function may be shifted to $\cos(\alpha_0)$ to enable overhang angle based control for self-supporting designs, as will be described below.

PUP Formulation

With the definition for the PUP given by equation (1) above, the PUP may be formulated into a topology optimization approach as:

$$\min_{u \in U\gamma} C(u) \quad (2)$$

$$\text{s.t.} \quad a_E(u, v) = l(v), \forall v \in U_0 \quad (3)$$

-continued $$\frac{\int_\Omega \gamma d\Omega}{V_0} \leq \eta_0, \gamma[0, 1] \quad (4)$$

$$\int_\Omega H(b \cdot \nabla \gamma) b \cdot \nabla \gamma d\Omega \leq P_0 \quad (5)$$

$$\frac{\int_\Omega 4\gamma(1-\gamma)d\Omega}{V_0} \leq \varepsilon_0. \quad (6)$$

In the formulation of equations (2-6) above, equations (2), (3), and (4) form the standard formulation of density based topology optimization for a minimal compliance (equation (2)), problem under an equilibrium constraint (equation (3)) and the volume constraint (equation (4)) where u is displacement and $\gamma \in [0,1]$ is the density (design) field, $V_0$ represents the volume of the design domain, and $\eta_0$ represents the allowed volume fraction of the material. A power low based solid isotropic material with penalization (SIMP) procedure may be adopted to interpolate material property. The resulting energy bilinear form can be noted as:

$$a_E(u,v) = \int_\Omega E(\gamma) \sigma(u) : \varepsilon(v) dx \quad (7)$$

where $\sigma(u)$ is the stress tensor, $\varepsilon(v)$ is the symmetric gradient, and $E(\gamma) = E_{min} + \gamma^q E_0$.

In order to account for support structures, the formulation of equations (2-6) adds two additional constraints with equation (5) constraining the PUP and equation (6) constraining the grayness. The grayness constraint is imposed to prevent the appearance of trivial solutions of intermediate density. $P_0$ represents an allowed PUP and co is a specified grayness measure. When $\gamma=0$ or 1, the integrand in equation (6) vanishes (i.e., equals 0). When $\gamma=0.5$, the integrand in equation (6) becomes 1. So, the left hand side (LHS) of equation (6) gives a measure of grayness of the resulting design. Clearly, the integral forms of both equations (5) and (6) are easy to compute and differentiate.

Figures 2A, 2B, 2C:
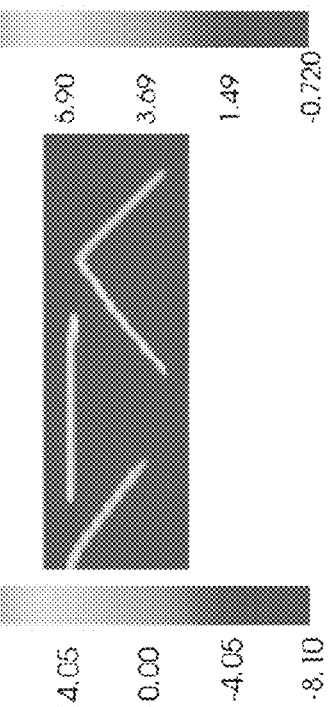
FIG. 2A is an illustration of a design with no projected undercut perimeter constraint.
FIG. 2B is an illustration of a directional gradient for the design of FIG. 2A.
FIG. 2C is an illustration of a Heavisided directional gradient for the design of FIG. 2A.

FIGS. 2A-4C illustrate the proposed approach for constraining support structures (i.e., using PUP to control the undercut structure and thereby the support structures). The domain size for each of the images illustrated in FIGS. 2A-4C is of size (6×2. In FIGS. 2A-C, there is no PUP constraint or grayness constraint. In FIGS. 3A-C, the PUP constraint $P_0=2.0$ and no grayness constraint is imposed. In FIGS. 4A-C, the PUP constraint $P_0=2.0$ and the grayness constraint $\varepsilon_0=0.15$. In each of FIGS. 2A-4C, the figures with the suffix "A" illustrate the optimized designs, the figures with the suffix "B" illustrate the corresponding directional gradient of the density, $b \cdot \nabla \gamma$, along the vertical build direction $b=(0,1)$, and the figures with the suffix "C" illustrate the corresponding Heavisided directional gradient $H(b \cdot \nabla \gamma) b \cdot \nabla \gamma$. The resulting compliance of the designs illustrated in FIGS. 2A, 3A, and 4A are 208.57, 353.85, and 299.71, respectively.

As shown in FIGS. 2A-4C, a geometric meaning of the Heaviside directional gradient $H(b \cdot \nabla \gamma) b \cdot \nabla \gamma$ can be interpreted. For a vertical build direction b, locations 200, 202 and 302 in the optimized designs of FIGS. 2A and 3A are examples of boundary with undercut and location 204 is an example of boundary without undercut. Location 300 is an example of a vertical wall. With specific reference to FIGS. 2B and 3B, the locations with undercut 200, 202, and 302 are each have a positive directional gradient $b \cdot \nabla \gamma$. On the other hand, in regions without undercut, the directional gradient $b \cdot \nabla \gamma$ is negative. Vertical sidewall (e.g., location 300) correspond to zero directional gradient $b \cdot \nabla \gamma$. Turning to FIGS. 2C and 3C, after Heavisiding the directional gradient, only regions with undercuts (i.e., the positive directional gradient) retain the directional gradient value and regions without undercuts become zero. The numerical value of H ($b \cdot \nabla \gamma$) $b \cdot \nabla \gamma$ can correspond to an overhang angle, assuming a clear boundary between the solid and the void. This can be illustrated by comparing the directional gradient at locations 200, 202, 204, 300, and 302. Location 202 has the highest value of the directional gradient in FIGS. 2B and 2C since it has 0° overhang. Location 200 and 302 have smaller values of the directional gradient due to their larger overhang angles. Location 300 corresponds with a vertical sidewall and, thus, its boundary does not contribute to the integral of the directional gradient.

With continued reference to FIGS. 2A-4C, a geometric meaning of the integral of the Heavisided directional gradient $\int_\Omega H (b \cdot \nabla \gamma) b \cdot \nabla \gamma d\Omega$ from equation (1) can be interpreted. The integral of such Heavisided directional gradient, shown in FIGS. 2C, 3C, and 4C, can measure the overall perimeter of the boundary with undercut projected along the build direction. For each of the illustrated designs, geometrically, the PUP corresponds to the integral of the quantities shown in FIGS. 2C, 3C, and 4C, respectively. For example, in the design of FIG. 4A, the PUP corresponds to the sum of horizontal length of the two boundary segments with undercut, $L_1$ and $L_2$. The design of FIG. 2A, which has no PUP constraint, has a PUP P=6.48. Both of the designs shown in FIGS. 3A and 4A meet the PUP constraint, with P=2.0. FIGS. 2A-4C clearly illustrate that the design of FIG. 2A has approximately three times longer PUP than the designs of FIGS. 3A and 4A, and that the designs of FIGS. 3A and 4A have approximately the same PUP.

A role of the grayness constraint $c_0$ can be illustrated by comparing FIGS. 3A-C to FIGS. 4A-C. Both the designs of FIGS. 3A and 4A meet the PUP constraint, but the design of FIG. 3A has grayness $\varepsilon$=0.43, which is a relatively large value due to intermediate density in the middle of the design. The near uniform density between locations 300 and 302 leads to low density gradient. This may suggest that a PUP constraint alone can lead to designs with near-uniform intermediate density. By imposing the grayness constraint $\varepsilon_0$=0.15 in the design of FIG. 4A, the intermediate density disappears. The resulting design of FIG. 4A has a better compliance than the design of FIG. 3A.

Figures 3A, 3B, 3C:
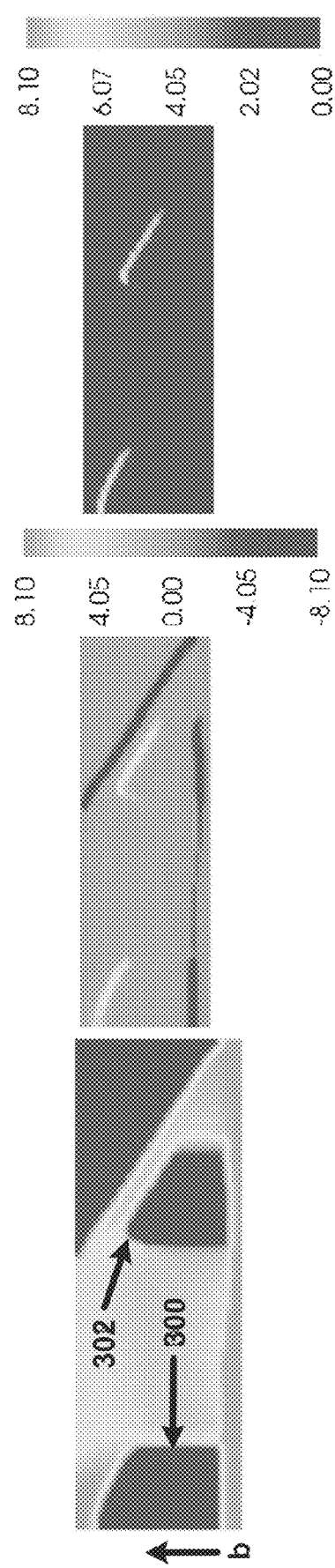
FIG. 3A is an illustration of a design with a projected undercut perimeter constraint $P_0=2.0$.
FIG. 3B is an illustration of a directional gradient for the design of FIG. 3A.
FIG. 3C is an illustration of a Heavisided directional gradient for the design of FIG. 3A.

As clearly shown when comparing the resulting designs of FIGS. 2A and 3A/4A, imposing the PUP constraint on the designs of FIGS. 3A and 4A resulted in designs with less support structures. Thus, the constraining the PUP, as defined by equation (5), is a viable approach to control the undercut structure and thereby the support structures in the design phase.

Overhang Angle Based Formulation

Figure 5:
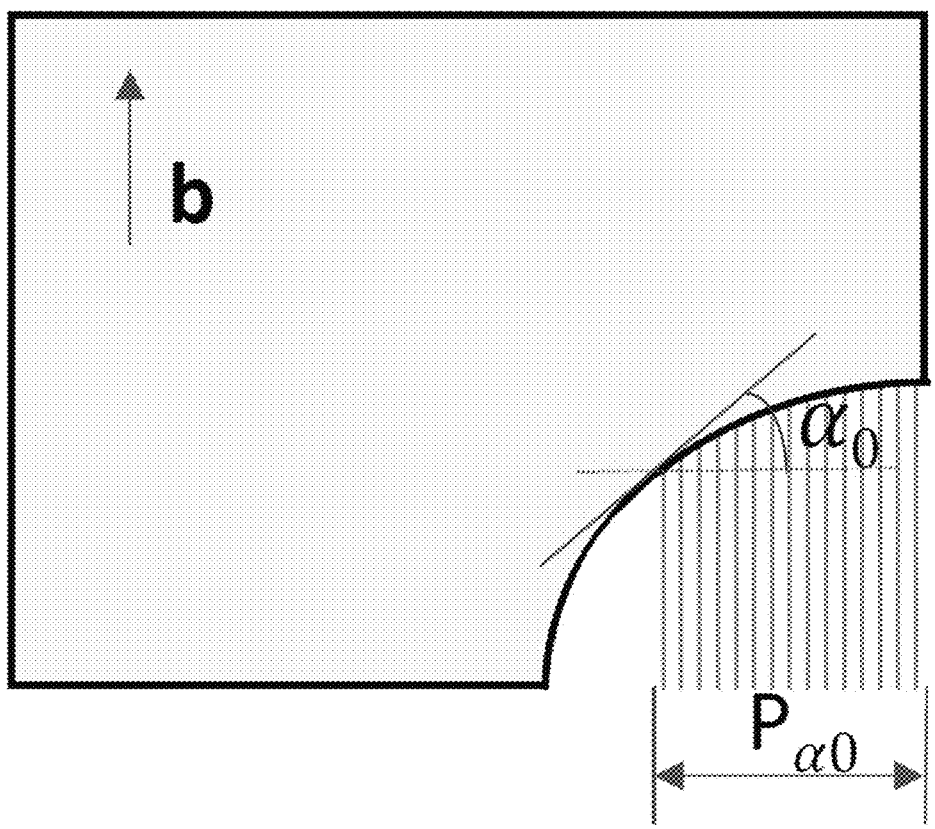
FIG. 5 is an illustration of an overhang angle, $\alpha_0$, according to another aspect of the present disclosure.

The PUP formulation described above and defined by equation (1) can be used effectively to control the amount of support structures. An alternative overhang angle based formulation may be desirable such that the part can be self-supported. As shown in FIG. 5, when an overhang angle $\alpha$ is larger than an allowed overhang angle $\alpha_0$, the structure can self support. That is, a support-free boundary satisfies the following $$b \cdot \frac{\nabla \gamma}{\|\nabla \gamma\|_2} \leq \cos(\alpha_0). \tag{8}$$

One formulation is described herein to constrain the overhang angle in topology optimization. First, the formulation for the PUP, as defined in equation (1), may be modified such that the Heaviside function transition thresholding occurs at $\cos(\alpha_0)$ as opposed to 0/1. That is, a Heaviside angle $\alpha_0$, may be imposed. Such a Heaviside function $H_{\alpha_0}$ can be denoted as $$H_{\alpha_0}\left(b \cdot \frac{\nabla \gamma}{\|\nabla \gamma\|_2}\right) \equiv H\left(b \cdot \frac{\nabla \gamma}{\|\nabla \gamma\|_2} - \cos(\alpha_0)\right) = \begin{cases} 0 & b \cdot \frac{\nabla \gamma}{\|\nabla \gamma\|_2} < \cos(\alpha_0) \\ 0.5 & b \cdot \frac{\nabla \gamma}{\|\nabla \gamma\|_2} = \cos(\alpha_0) \\ 1 & b \cdot \frac{\nabla \gamma}{\|\nabla \gamma\|_2} > \cos(\alpha_0) \end{cases} \tag{9}$$

The overhang angle based constraint can be formulated as $$P_{\alpha_0} \equiv \int_\Omega H_{\alpha_0}\left(b \cdot \frac{\nabla \gamma}{\|\nabla \gamma\|_2}\right) b \cdot \nabla \gamma d\Omega \leq 0. \tag{10}$$

The geometric meaning of the quantity $P_{\alpha 0}$ is that it corresponds to the perimeter of the boundary with overhang angle larger than $\alpha_0$, as shown in FIG. 5. That is, the PUP $P_{\alpha 0}$ can effectively control the undercut volume that needs support. When $P_{\alpha 0}$ is constrained to be close to zero, it would lead to a design with no overhang angle smaller than critical overhang angle $\alpha_0$ (i.e., the design can self-support).

With this formulation, if the angle from directional gradient of the density is smaller than $\alpha_0$, it contributes to the $P_{\alpha 0}$ term in equation (10). If the angle is larger than $\alpha_0$ (i.e., self-supporting), it does nothing. Therefore, when this constraint is satisfied, there is no directional gradient that has overhang angle smaller than $\alpha_0$. That is, the design self supports. In order to prevent potential oscillation of the boundary, a perimeter constraint $\int_\Omega |\nabla \gamma| d\Omega \leq Q_0$ can be imposed, where $Q_0$ is the allowed perimeter. Analytic sensitivity of this global constraint in equation (10) can be obtained efficiently through adjoint sensitivity. It should be noted that the formulation of equation (10) subsumes the formulation of equation (1) with $\alpha_0$=0. That is, formulation of equation (1) is a special case of the formulation of equation (10).

Figure 6A:
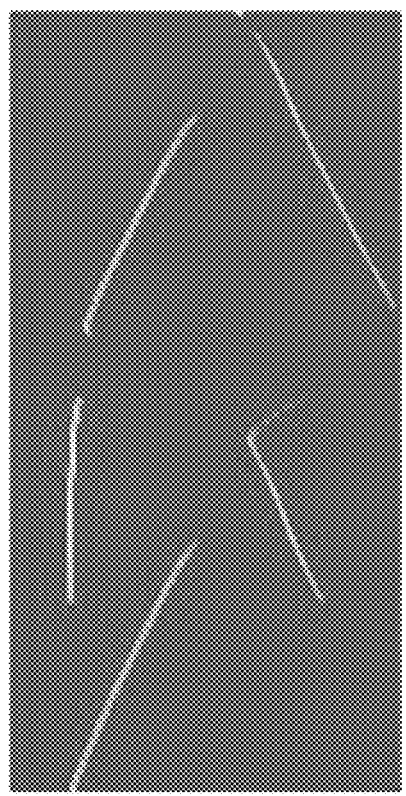
FIG. 6A is an illustration of a design.
Figure 6B:
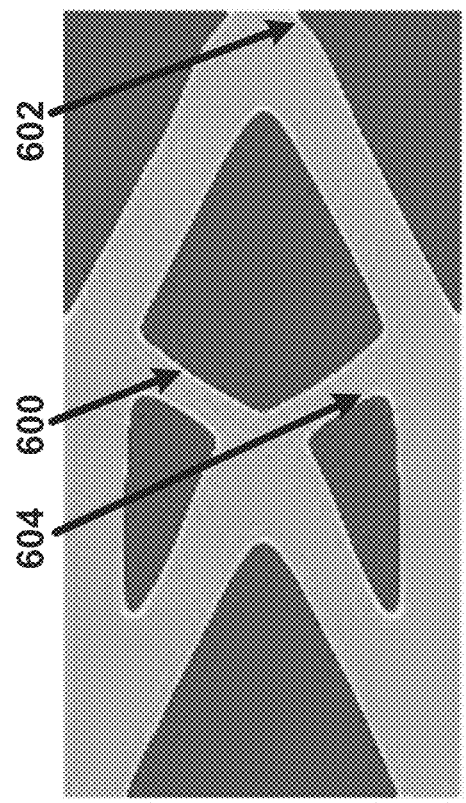
FIG. 6B is an illustration of a directional gradient for the design of FIG. 6A projected based on an overhang angle $\alpha_0=30°$.

FIGS. 6A and 6B illustrate the proposed approach for controlling an overhang angle of the undercut volume that needs support. FIG. 6A shows a design and FIG. 6B shows a corresponding directional gradient $b \cdot \nabla \gamma$ projected based on overhang angle $$a_0 = 30, \text{ i.e., } H_{\alpha_0}\left(b \cdot \frac{\nabla \gamma}{\|\nabla \gamma\|_2}\right) b \cdot \nabla \gamma.$$

The boundaries near locations 600 and 602 in FIG. 6A do not appear in FIG. 6B since the overhang angle at these locations is larger than 30°. Boundary near the location 604 in FIG. 6A sparsely appears in FIG. 6B. All other boundaries with overhang angle smaller than $\alpha_0$ is preserved in the projected directional gradient plot of FIG. 6B. Therefore, when the integral of such projected directional gradient $$H_{\alpha 0}\left(b \cdot \frac{\nabla \gamma}{\|\nabla \gamma\|_2}\right) b \cdot \nabla \gamma$$

approaches zero, the resulting design has no overhang angle smaller than $\alpha_0$ and, thus, can self-support.

INDUSTRIAL APPLICABILITY

The above described approaches (i.e., the PUP formulation and/or the overhang angle based PUP formulation) may be integrated into a manufacturing system to enable the design and manufacture of a part. It should be appreciated that although the following description relates to an additive manufacturing system, due to the similarity in direction based shape control, the systems and methods disclosed herein may also positively impact the resolutions of other manufacturability constraints such as casting, molding, and milling, to name a few.

Figure 7:
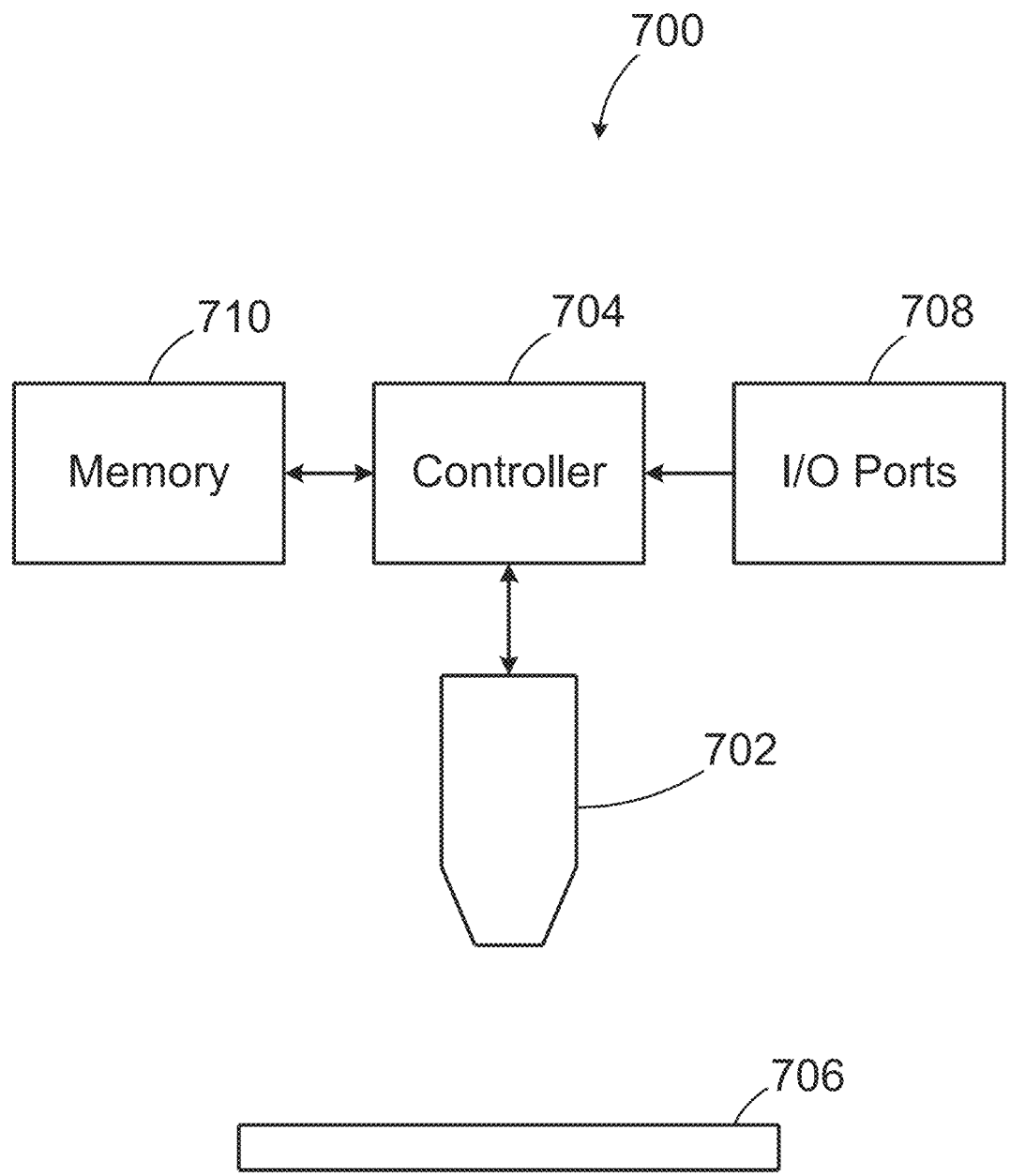
FIG. 7 is a schematic illustration of an additive manufacturing system according to one aspect of the present disclosure.

FIG. 7 shows a non-limiting example of an additive manufacturing system 700 configured to control an amount of support structures in manufactured part using one or more of the above-described formulations. The additive manufacturing system 700 may include a print head. 702 in communication with a controller 704, and a mounting surface 706.

The print head 702 can be configured to deposit material additively to manufacture a part. The print head 702 may be coupled to an mechanical linkage (not shown) capable of positioning the print head 702 in any location in a 3-D coordinate system above the mounting surface 706. The positioning of the print head 702 may be controlled by the controller 704. The print head 702 is configured to deposit material on the mounting surface 706 to produce a part. Alternatively or additionally, the print head 702 may be configured to deposit material on an existing part mounted on the mounting surface 706. The material deposited by the print head 702 can be a polymer, a metal, glass, sands, waxes, paper, or any other material known in the art or developed in the future. The controller 706 can be in communication with I/O ports 708 and a memory storage device 710.

Figure 8:
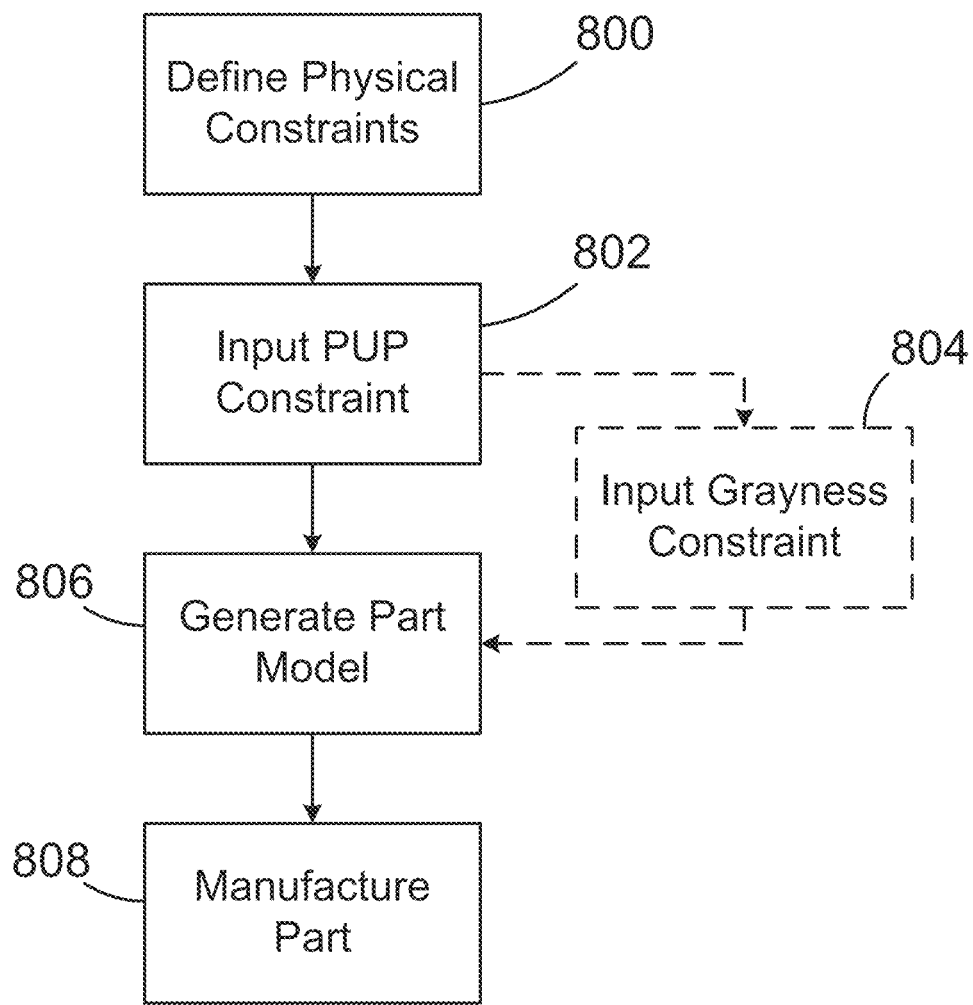
FIG. 8 is a flowchart outlining the steps for designing and manufacturing a part according to one aspect of the present disclosure.

One non-limiting example of designing and manufacturing a part using the additive manufacturing system 700 will be described below with reference to FIGS. 7 and 8. As shown in FIG. 8, at step 800 physical constraints for a desired part can be defined. The physical constraints can be defined within the controller 704 or the physical constraints may be input to the controller 704 by an external controller (not shown) via the I/O ports 708. Alternatively or additionally, the physical constraints may be stored in the memory storage device 710 and accessible by the controller 704. Once the physical constraints have been defined at step 800, a PUP constraint is input at step 802 to either the external controller or directly to the controller 704. In some non-limiting examples, a grayness constraint is also input at step 804.

With the PUP constraint input at step 802, the topology and shape of the part can be generated in a model (i.e., an electronic representation of the part) via topology optimization at step 806. The part model generated at step 806 may be generated using one or more of the formulation of equations (2-6), above. Alternatively or additionally, the part model generated at step 806 may incorporate one or more of equations (9) and (10) to additionally control an overhang angle in the generated part. In any case, the part model generated at step 806 can include a lower amount of support structures (when compared to parts designed without a PUP constraint) due to the PUP constraint input at step 802. In one non-limiting example, the part model may be generated by the controller 704. In another non-limiting example, the part model may be generated by an external controller and subsequently communicated to the controller 704 via the I/O ports 708.

Once the part model is generated at step 806, a part can be manufactured at step 808 based on design of the part model. The part may be manufactured at step 808 by the controller 704 instructing the print head 702 to additively deposit material in layers on the mounting surface 706.

EXAMPLES

The following examples set forth, in detail, ways in which the above-described design formulations may be used or implemented, and will enable one of skill in the art to more readily understand the principles thereof. The following examples are presented by way of illustration and are not meant to be limiting in any way.

The following 2D and 3D numerical results are based on optimized designs of Messerschmidt-Bölkow-Blohm (MBB) beams or simple cantilever beams under various PUP and grayness constraints.

2D Examples

For each of the following 2D examples, the domain is 6×2 and is divided into 9,600 linear triangular elements with 4,961 nodes. The r for the PDE filter was chosen to be 0.043, the volume fraction $\eta_0$ is 0.5, $E_0=1.0$, $E_{min}=1.0e-9$, and $q=5$.

Figure 9A:
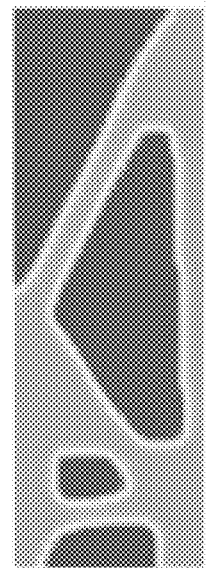
FIG. 9A is an illustration of an optimized 2D design with a projected undercut perimeter constraint $P_0=4.0$ and a grayness constraint $\varepsilon_0=0.175$.
Figure 9B:
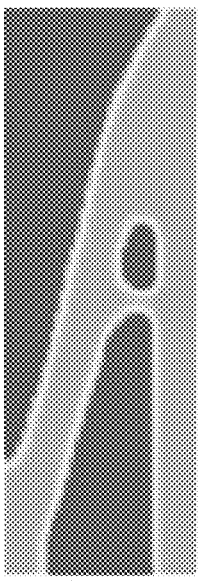
FIG. 9B is an illustration of an optimized 2D design with a projected undercut perimeter constraint $P_0=3.5$ and a grayness constraint $\varepsilon_0=0.15$.
Figure 9C:
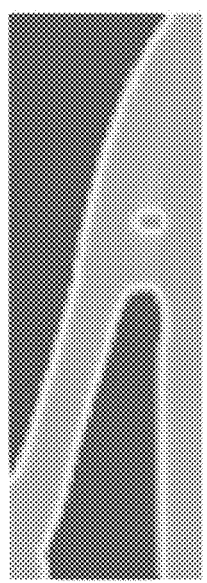
FIG. 9C is an illustration of an optimized 2D design with a projected undercut perimeter constraint $P_0=3.0$ and a grayness constraint $\varepsilon_0=0.15$.
Figure 9D:
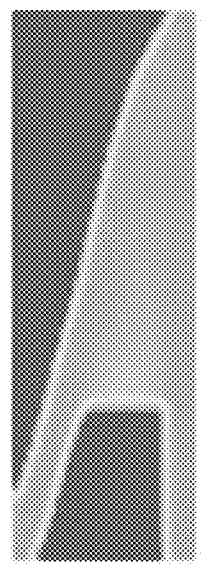
FIG. 9D is an illustration of an optimized 2 D design with a projected undercut perimeter constraint $P_0=2.5$ and a grayness constraint $\varepsilon_0=0.15$.
Figure 9E:
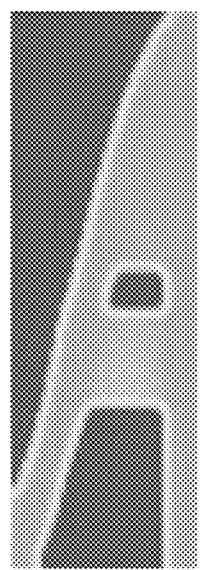
FIG. 9E is an illustration of an optimized 2D design with a projected undercut perimeter constraint $P_0=2.0$ and a grayness constraint $\varepsilon_0=0.15$.
Figure 9F:
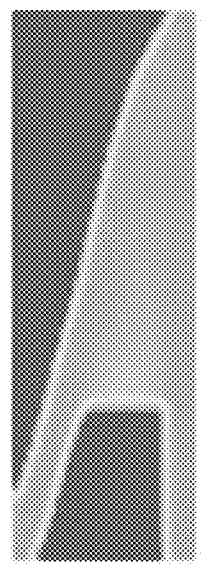
FIG. 9F is an illustration of an optimized 2D design with a projected undercut perimeter constraint $P_0=1.5$ and a grayness constraint $\varepsilon_0=0.15$.

FIGS. 9A-F shows optimized designs under different PUP constraints with $P_0$ decreasing from 4.0 in FIG. 9A to 1.5 in FIG. 9F. The corresponding grayness constraint for FIG. 9A was 0.175 and 0.15 for FIGS. 9B-9F. The compliance for FIGS. 9A-9F are 243.95, 267.14, 269.88, 275.23, 299.62, and 326.31, respectively. As shown in FIGS. 9A-9F, as $P_0$ becomes smaller from FIG. 9A to FIG. 9F, the projected undercut perimeter indeed becomes smaller and the compliance becomes larger. As a result, the resulting designs sequentially include less support structure from FIG. 9A to FIG. 9F.

Figure 10A:
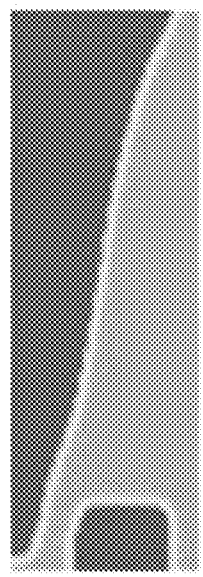
FIG. 10A is an illustration of an optimized 2D design with a projected undercut perimeter constraint $P_0=1.0$ and a grayness constraint $\varepsilon_0=0.12$.
Figure 10B:
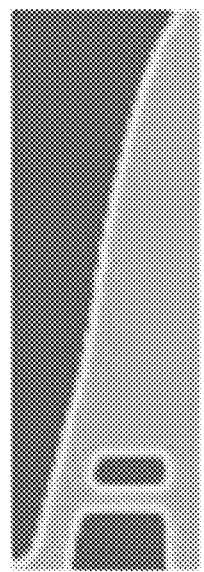
FIG. 10B is an illustration of an optimized 2D design with a projected undercut perimeter constraint $P_0=0.8$ and a grayness constraint $\varepsilon_0=0.12$.
Figure 10C:
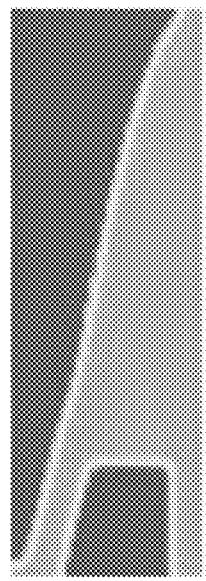
FIG. 10C is an illustration of an optimized 2D design with a projected undercut perimeter constraint $P_0=0.6$ and a grayness constraint $\varepsilon_0=0.12$.
Figure 10D:
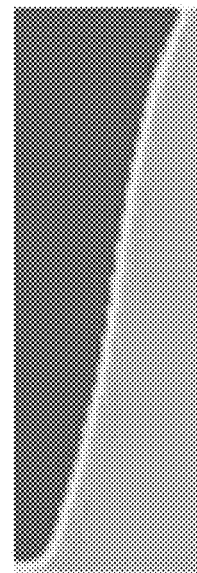
FIG. 10D is an illustration of an optimized 2D design with a projected undercut perimeter constraint $P_0=0.4$ and a grayness constraint $\varepsilon_0=0.12$.
Figure 10E:
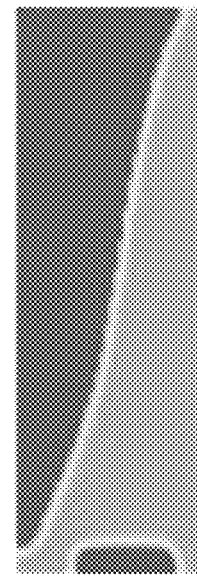
FIG. 10E is an illustration of an optimized 2D design with a projected undercut perimeter constraint $P_0=0.2$ and a grayness constraint $\varepsilon_0=0.09$.
Figure 10F:
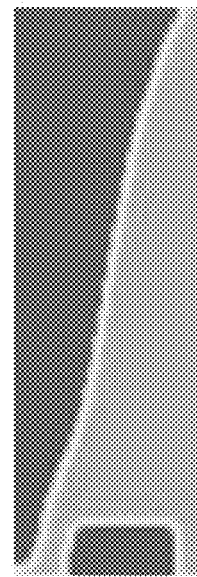
FIG. 10F is an illustration of an optimized 2D design with a projected undercut perimeter constraint $P_0=0.1$ and a grayness constraint $\varepsilon_0=0.075$.

FIGS. 10A-10F show optimized designs under different PUP constraints with $P_0$ ranging from 1.0 in FIG. 10A to 0.1 in FIG. 10F. The grayness constraint for FIGS. 10A-10F are 0.12, 0.12, 0.10, 0.10, 0.09, and 0.075, respectively. The compliance for FIGS. 10A-10F are 417.89, 466.41, 493.67, 530.57, 605.28, and 651.08, respectively. As shown in FIGS. 10A-10F, similar to FIGS. 9A-9F, as $P_0$ becomes smaller from FIG. 10A to FIG. 10F, the projected undercut perimeter indeed becomes smaller and the compliance becomes larger. When. $P_0$ is 0.1 in FIG. 10F, the resulting design has no undercut at all and the projected undercut perimeter $P=-0.084$. Thus, the PUP constraint can be reduced to a point where the resulting design includes no support structures. As a general rule, which can be illustrated by FIGS. 10A-10F, as the PUP constraint becomes smaller, the grayness measure also becomes smaller. At the boundary, the intermediate density transitioning between the solid and the void occurs. For designs with large undercut perimeters, more intermediate density occurs and thus a larger grayness measure is desired.

Figure 11A:
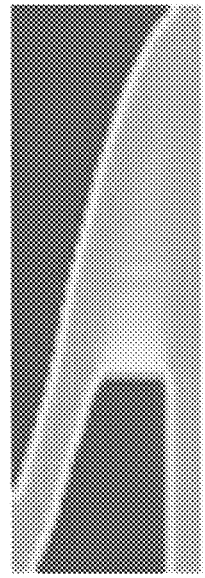
FIG. 11A is an illustration of an optimized 2D design with a projected undercut perimeter constraint $P_0=2.0$ and a grayness constraint $\varepsilon_0=0.20$.
Figure 11B:
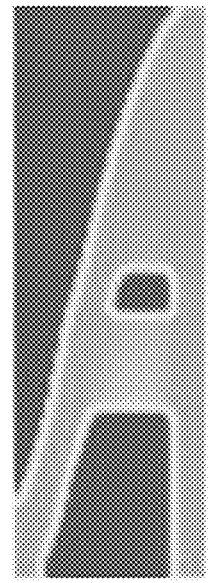
FIG. 11B is an illustration of an optimized 2D design with a projected undercut perimeter constraint $P_0=2.0$ and a grayness constraint $\varepsilon_0=0.15$.
Figure 11C:
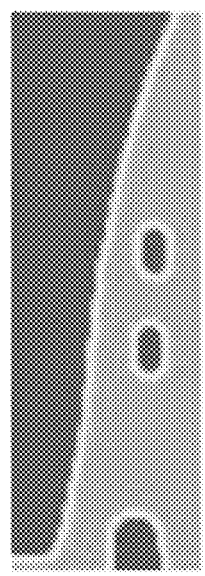
FIG. 11C is an illustration of an optimized 2D design with a projected undercut perimeter constraint $P_0=2.0$ and a grayness constraint $\varepsilon_0=0.12$.

FIGS. 11A-11C show the resulting designs under different grayness constraints with $\varepsilon_0$ ranging from 0.2 in FIG. 11A to 0.12 in FIG. 11C. The PUP constraint $P_0$ was 2.0 for each of the designs in FIGS. 11A-11C. With the constraint $\varepsilon_0=0.2$, the resulting design contains substantial intermediate density as shown in FIG. 11A and the grayness constraint is inactive with grayness $\varepsilon=0:16$, but the PUP constraint is active with $P=P0=2.0$. When the constraint $\varepsilon_0=0.15$, both the PUP constraint and the grayness constraints are active, i.e. $P=P0=2.0$ and $\varepsilon=\varepsilon_0=0.15$. When the constraint becomes smaller with $\varepsilon=0.12$, the PUP constraint is inactive with $P=1.36$ and the grayness constraint is active with $\varepsilon=\varepsilon_0=0.15$. These non-limiting examples of FIGS. 11A-11C suggest, with a loose grayness constraint, the design is mostly constrained by the PUP constraint. On the other hand, with a tight grayness constraint, the design is constrained by the grayness constraint. For an intermediate grayness constraint, the resulting designs are constrained by both the PUP constraint and the grayness constraint.

Figure 12A:
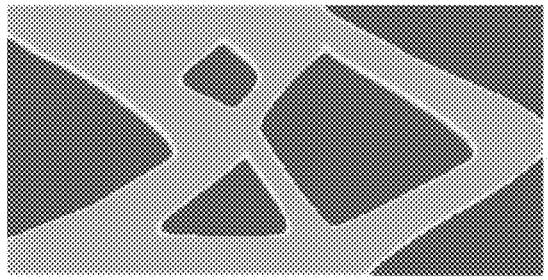
FIG. 12A is an illustration of an optimized 2D design with an overhang angle constraint $\alpha_0=15°$.
Figure 12B:
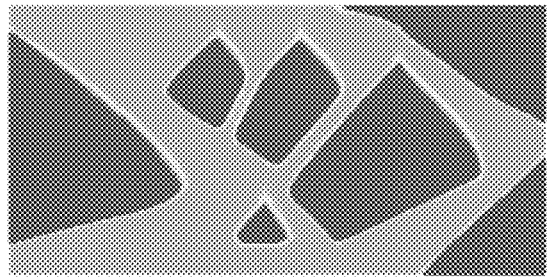
FIG. 12B is an illustration of an optimized 2D design with an overhang angle constraint $\alpha_0=30°$.
Figure 12C:
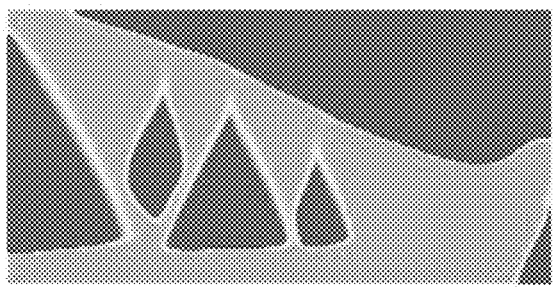
FIG. 12C is an illustration of an optimized 2D design with an overhang angle constraint $\alpha_0=45°$.
Figure 12D:
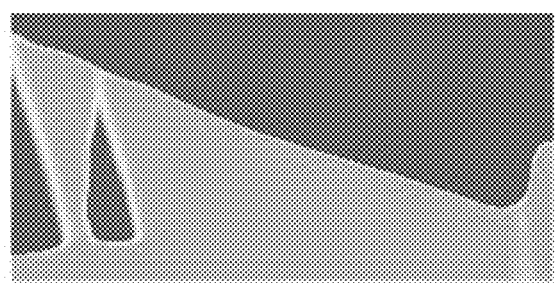
FIG. 12D is an illustration of an optimized 2D design with an overhang angle constraint $\alpha_0=60°$.
Figure 12E:
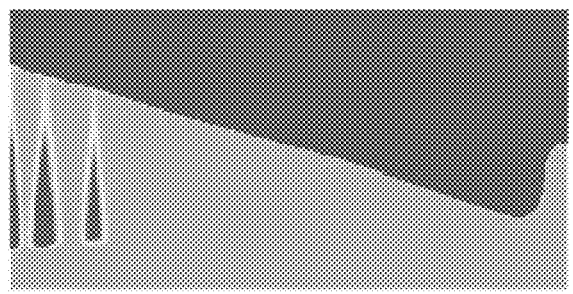
FIG. 12E is an illustration of an optimized 2D design with an overhang angle constraint $\alpha_0=75°$.

FIGS. 12A-E show the results optimized cantilever beams under different overhang angle $\alpha_0$ constraints with $\alpha_0$ ranging from 15° in FIG. 12A to 75° in FIG. 12E. As shown in FIGS. 12A-E, as the overhang angle $\alpha_0$ increases from FIG. 12A to FIG. 12E, the minimal slope of the boundary in these designs becomes higher and the overhang angle in these designs increase. It can also be seen that in all cases, the minimal overhang angle is larger than the corresponding $\alpha_0$ in each design.

3D Examples

Figure 13B:
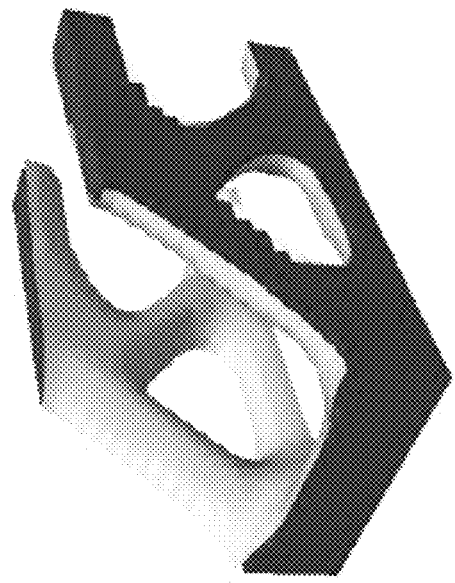
FIG. 13B is an illustration of an optimized 3D design with a projected undercut perimeter constraint $P_0=2.0$.
Figure 13D:
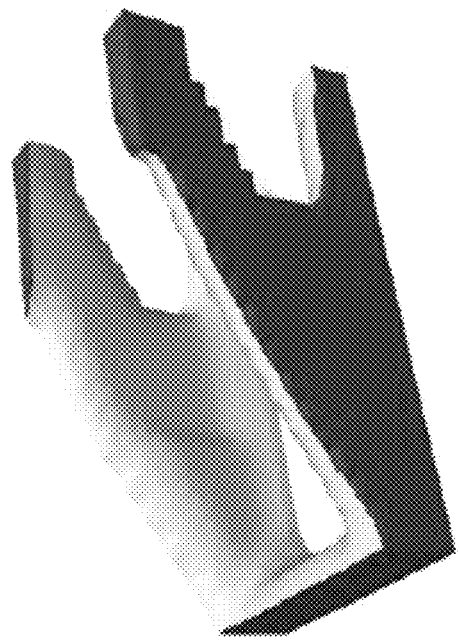
FIG. 13D is an illustration of an optimized 3D design with a projected undercut perimeter constraint $P_0=0.5$.
Figure 13A:
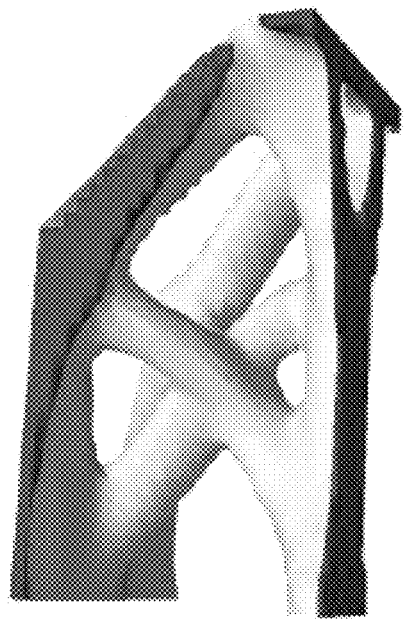
FIG. 13A is an illustration of an optimized 3D design with no projected undercut perimeter.
Figure 13C:
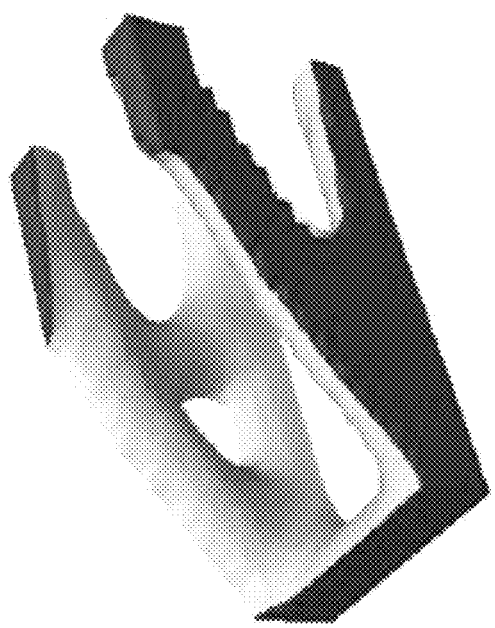
FIG. 13C is an illustration of an optimized 3D design with a projected undercut perimeter constraint $P_0=1.0$.
Figure 13F:
FIG. 13F is an illustration of an optimized 3D design with a projected undercut perimeter constraint $P_0=1.0e-4$.
Figure 13E:
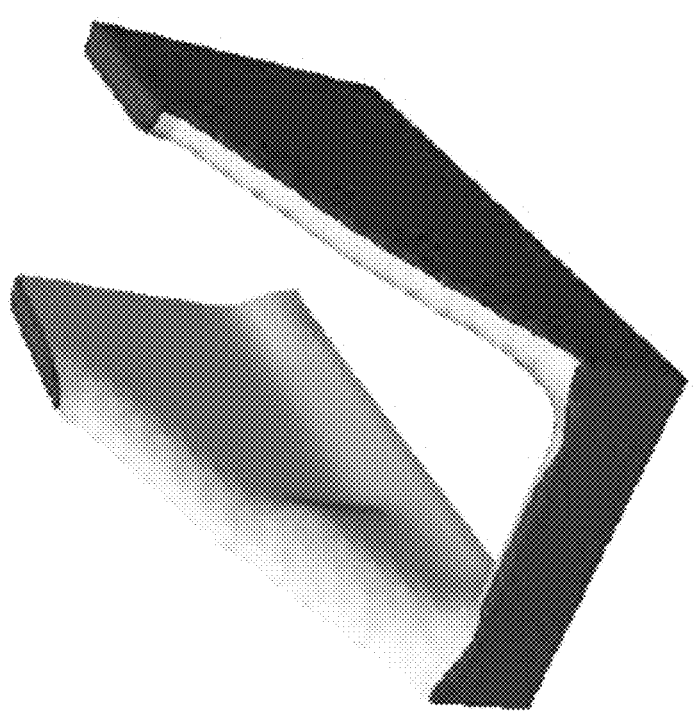
FIG. 13E is an illustration of an optimized 3D design with a projected undercut perimeter constraint $P_0=1.0e-3$.

FIGS. 13A-13F show optimized 3D designs under PUP constraints with no constraint in FIG. 13A and $P_0$ ranging from 2.0 in FIG. 13B to 1.0e-4 in FIG. 13F. Specifically, $P_0$ is 2.0, 1.0, 0.5, 1.0e-3, and 1.0e-4 for FIGS. 13B-13F, respectively. The domain for FIGS. 13A-13F is 4×2×2 and is divided into 9,600 linear tetrahedral elements, consisting of 18,081 nodes. The volume fraction $\eta_0$ is 15% of the design domain. The primary and adjoint state equations are solved via an iterative solver, successive over-relaxation as a preconditioner in a conjugated gradient iterative solver. Each of the designs in FIGS. 13A-13F are obtained with the grayness constraint $\varepsilon_0=0.2$, except FIGS. 13E and 13F. FIGS. 13E and 13F are obtained with $\varepsilon_0=0.15$. The resulting compliances for FIGS. 13A-13F, are 1.448e5, 1.294e5, 1.286e5, 1.400e5, 1.656e5, and 3.583e5.

As shown in FIGS. 13A-13F, as the PUP becomes smaller, the resulting designs have less support volume. Eventually, when the PUP becomes close to zero (i.e., 1e-3 and 1e-4), the resulting designs of FIGS. 13E and 13F have no undercut. This further suggests that the proposed PUP approach is an effective measure for controlling support structures. Additionally, optimized 3D designs under PUP constraint may have a better objective function (compliance) since the designs of FIGS. 13B, 13C, and 13D all have smaller compliance than the design without PUP constraint of FIG. 13A. This can be ascribed to the fact that multiple local minimums exist for the non-convex optimization problem. Further, these results suggest that accounting for support structures in topology optimization for manufacturing may lead to designs with better performance, in addition to the reduction of support structures.

Thus, while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

I claim:

1. An additive manufacturing system comprising:
a print head;
a controller in communication with the print head and configured to:
design a part model based on physical constraints and a projected undercut perimeter, wherein the projected undercut perimeter corresponds with a perimeter quantity of a boundary of the part with undercut projected along a build direction and the projected undercut perimeter is constrained to be less than or equal to a non-zero allowable projected undercut perimeter; and
instruct the print head to deposit material additively to manufacture the part such that the manufactured part has a total undercut that is greater than zero and no greater than the allowable projected undercut perimeter, wherein the part is a physical representation of the part model.

2. The additive manufacturing system of claim 1, wherein the projected undercut perimeter defines an amount of support structure in the part.

3. The additive manufacturing system of claim 1, wherein the perimeter quantity corresponds with a perimeter undercut length.

4. The additive manufacturing system of claim 1, wherein the perimeter quantity corresponds with a perimeter undercut area.

5. The additive manufacturing system of claim 1, wherein the controller is further configured to:
determine if locations along the boundary of the part include undercut; and
constrain the projected undercut perimeter for each location along the boundary of the part that includes undercut such that an integrated projected undercut perimeter is less than or equal to the non-zero allowable projected undercut perimeter.

6. The additive manufacturing system of claim 1, wherein the projected undercut perimeter is defined as an integration of a directional gradient multiplied with a Heaviside function over a design domain.

7. The additive manufacturing system of claim 6, wherein the controller is further configured to:
determine if locations along the boundary of the part define a positive directional gradient or a negative directional gradient;
equate the Heaviside function to zero for each location along the boundary of the part that defines a negative directional gradient; and
equate the Heaviside function to one for each location along the boundary of the part that defines a positive directional gradient.

8. The additive manufacturing system of claim 6, wherein the controller is further configured to:
determine if the directional gradient at locations along the boundary of the part defines an overhang angle that is less than an allowed overhang angle; and
contribute to the projected undercut perimeter for each location along the boundary of the part where the overhang angle is less than the allowed overhang angle such that the projected undercut perimeter is less than or equal to the allowable projected undercut perimeter.

9. The additive manufacturing system of claim 1, wherein the controller is further configured to:
receive, as input, the allowable projected undercut perimeter.

* * * * *

UNITED STATES PATENT AND TRADEMARK OFFICE
CERTIFICATE OF CORRECTION

PATENT NO. : 11,383,444 B2  
APPLICATION NO. : 16/704899  
DATED : July 12, 2022  
INVENTOR(S) : Xiaoping Qian Page 1 of 1

It is certified that error appears in the above-identified patent and that said Letters Patent is hereby corrected as shown below:

In the Specification

Column 2, Line 42, "executed color" should be --executed in color--.

Column 7, Line 34, "co" should be --$\varepsilon_0$--.

Signed and Sealed this
Sixth Day of September, 2022

Katherine Kelly Vidal
*Director of the United States Patent and Trademark Office*